(12) United States Patent
Einhaus et al.

(10) Patent No.: US 8,483,734 B2
(45) Date of Patent: Jul. 9, 2013

(54) DYNAMIC ALLOCATION OF RADIO RESOURCES IN A MULTICARRIER COMMUNICATION SYSTEM

(76) Inventors: Michael Einhaus, Aachen (DE); Rüdiger Halfmann, Otterberg (DE); Matthias Lott, Planegg (DE); Martin Weckerle, Ulm (DE)

(*) Notice: Subject to any disclaimer, the term of this patent is extended or adjusted under 35 U.S.C. 154(b) by 1383 days.

(21) Appl. No.: 11/884,574

(22) PCT Filed: Dec. 22, 2005

(86) PCT No.: PCT/EP2005/057071
§ 371 (c)(1),
(2), (4) Date: May 28, 2008

(87) PCT Pub. No.: WO2006/087047
PCT Pub. Date: Aug. 24, 2006

(65) Prior Publication Data
US 2009/0143088 A1    Jun. 4, 2009

(30) Foreign Application Priority Data

Feb. 17, 2005  (DE) .......................... 10 2005 007 326

(51) Int. Cl.
| | |
|---|---|
| H04B 7/15 | (2006.01) |
| H04B 7/00 | (2006.01) |
| H04B 7/14 | (2006.01) |
| H04W 40/00 | (2009.01) |
| H04W 4/00 | (2009.01) |
| H04J 11/00 | (2006.01) |
| H04J 1/10 | (2006.01) |
| H04J 3/08 | (2006.01) |
| H04L 27/28 | (2006.01) |
| H04L 27/00 | (2006.01) |
| G06F 15/16 | (2006.01) |

(52) U.S. Cl.
USPC .......... 455/509; 455/11.1; 455/448; 455/522; 307/208; 307/315; 307/329; 375/260; 375/295; 709/236

(58) Field of Classification Search
USPC ................... 455/7, 11.1, 447, 450, 502, 507, 455/509, 517, 522, 560, 63.1; 370/206, 208, 370/256, 315, 328, 329, 335, 338, 476, 503, 370/210, 216, 342, 343, 444, 478; 709/236; 375/260, 295, 135
See application file for complete search history.

(56) References Cited

U.S. PATENT DOCUMENTS 7,646,752 B1 * 1/2010 Periyalwar et al. ........... 370/338
2002/0131025 A1  9/2002 Kuroda et al.
(Continued)

FOREIGN PATENT DOCUMENTS

| CN | 1481633 A | 3/2004 |
|---|---|---|
| DE | 198 00 953 C1 | 7/1999 |

(Continued)

OTHER PUBLICATIONS

Ram Ramanathan and Martha Steenstrup; "Hierarchically-organized, multihop mobile wireless networks for quality-of-service support"; 1998; pp. 101-119, Mobile Networks and Applications 3.*
International Search Report of Application No. PCT/EP2005/057071; mailed Apr. 6, 2006.

Primary Examiner — Andrew Wendell
Assistant Examiner — Paul P Tran

(57) ABSTRACT

Communication carried out over a frequency band divided into a plurality of subcarriers by messages transmitted between a first radio station and a second radio station in a plurality of hops between respectively adjacent radio stations arranged in hierarchical levels. A subset of the subcarriers is used for each hop. The subsets used are allocated by at least one higher level radio station and the composition of at least one of the subsets used varies over time.

10 Claims, 1 Drawing Sheet

U.S. PATENT DOCUMENTS

| | | |
|---|---|---|
| 2002/0147017 A1 | 10/2002 | Li et al. |
| 2002/0196732 A1 | 12/2002 | Mestdagh |
| 2004/0131025 A1 | 7/2004 | Dohler et al. |
| 2005/0063336 A1* | 3/2005 | Kim et al. .................... 370/329 |
| 2005/0094597 A1* | 5/2005 | Hwang et al. ................ 370/329 |
| 2005/0220002 A1* | 10/2005 | Li et al. ........................ 370/208 |
| 2006/0203707 A1* | 9/2006 | Lee et al. ...................... 370/208 |
| 2006/0209754 A1* | 9/2006 | Ji et al. ......................... 370/329 |

FOREIGN PATENT DOCUMENTS

| | | |
|---|---|---|
| EP | 1 608 193 A1 | 6/2004 |
| EP | 1 478 148 A1 | 11/2004 |
| EP | 1 324 509 A2 | 5/2005 |
| WO | 02/49385 A2 | 6/2002 |
| WO | WO 2004059897 A2 * | 7/2004 |

* cited by examiner

DYNAMIC ALLOCATION OF RADIO RESOURCES IN A MULTICARRIER COMMUNICATION SYSTEM

CROSS REFERENCE TO RELATED APPLICATIONS

This application is based on and hereby claims priority to German Application No. 10 2005 007 326.3 filed on 17 Feb. 2005, the contents of which are hereby incorporated by reference.

BACKGROUND

Described below are a method for communication in a radio communication system in which a frequency band divided into a plurality of subcarriers is used and messages are transmitted in a plurality of hops and radio stations for carrying out the method.

In radio communication systems messages, for example containing voice information, image information, video information, SMS (Short Message Service), MMS (Multimedia Messaging Service) or other data, is transmitted between sending and receiving radio stations by a radio interface using electromagnetic waves. Depending on the specific configuration of the radio communication system the radio stations can be different types of subscriber-side radio stations or network-side radio stations such as repeaters, radio access points or base stations in this connection. In a mobile communications system at least some of the subscriber-side radio stations are mobile radio stations. The electromagnetic waves are emitted at carrier frequencies which are in the frequency band provided for the respective system.

Mobile communications systems are often constructed as cellular systems, for example according to the GSM (Global System for Mobile Communication) or UMTS (Universal Mobile Telecommunications System) standards with a network infrastructure having, for example, base stations, devices for monitoring and controlling the base stations and further network-side devices. Apart from these cellular, hierarchical radio networks that are organized over a wide area (supralocal) there also exist wireless local networks (WLANs, Wireless Local Area Networks) with a radio coverage range that is usually much more strongly physically delimited. Examples of different standards for WLANs are HiperLAN, DECT, IEEE 802.11, Bluetooth and WATM.

A connection to other communication systems, thus for example to the Internet, can take place via the WLAN radio access points. For this purpose the radio stations of the WLAN communicate either directly with a radio access point or via other radio stations with more remote radio stations which forward the information between the radio station and the radio access point via a path between the radio station and the radio access point.

Radio stations can only communicate with each other directly if they are both in the radio coverage range of the respective other radio station. If direct communication is not possible, messages can be transmitted between these radio stations via other radio stations, which, by forwarding the messages, act as relay radio stations. Message forwarding of this kind can, as a function of the specific configuration of the radio communication system, be carried out by subscriber-side and network-side radio stations. Messages can be forwarded for example in a WLAN between a radio access point and subscriber-side radio stations that are a long way from the radio access point in a plurality of hops. Subscriber-side radio stations can also communicate with each other in one or more hop(s) (hop or multihop) in an ad hoc mode of a radio communication system without intermediate devices, such as base stations or radio access points having to be connected in series. With a message transmission from a subscriber-side radio station to a further subscriber-side radio station outside of its radio coverage range the messages are forwarded by other subscriber-side radio stations which thus act as relay radio stations.

To achieve optimally efficient transmission of data the entire available frequency band is divided into a plurality of subcarriers (multicarriers or multicarrier method). The idea underlying the multicarrier system is to transform the initial problem of transmitting a broadband signal into the transmission of a plurality of narrowband signals. This has the advantage inter alia that the complexity required at the receiver may be reduced. The division of available bandwidth into a plurality of narrowband subcarriers also allows a much higher granularity of data transmission with respect to the distribution of the data to be transmitted among the different subcarriers, i.e. the radio resources can be distributed among the data to be transmitted or subscriber's stations with a high degree of fineness. The available bandwidth can be efficiently utilized by way of allocation of a number of subcarriers to different subscriber-side radio stations in particular with transmissions with variable data rates or with burst-like data traffic.

OFDM (Orthogonal Frequency Division Multiplexing) is an example of a multicarrier transmission method in which pulse forms that are approximately rectangular over time are used for the subcarriers. The frequency spacing of the subcarriers is chosen such that in the frequency space in the case of the frequency at which the signal of a subcarrier is evaluated the signals of the other subcarriers have a zero point. The subcarriers are therefore orthogonal to each other. As a result of the usually very small spacing of the subcarriers and the narrowband nature of the signals transmitted on the individual subcarriers, with OFDM it should be ensured that the transmission within the individual subcarriers is, in general, not frequency-selective. This simplifies signal equalization at the receiver.

SUMMARY

An aspect is to present a method for communication by radio in which a frequency band divided into a plurality of subcarriers is used and messages are transmitted in a plurality of hops. Devices for carrying out the method shall also be disclosed.

In the method for communication in a radio communication system described below, a frequency band divided into a plurality of subcarriers is used for communication. Messages are transmitted between a first radio station and a second radio station by radio in a plurality of hops between respectively adjacent radio stations. A subset of the subcarriers is used for each hop and the composition of at least one of the subsets used varies over time.

The radio communication system being considered is a multicarrier system. OFDM for example can be used as the transmission method. Messages are transmitted between a first and a second radio station by at least one further radio station, i.e. in at least two hops. The radio stations can be network-side or subscriber-side, stationary or mobile radio stations. In particular the radio stations via which the hops or the path between the first and second radio station run can be stationary network-side repeaters or relays. The method can be used between the first and second radio station in relation to a specific path or in relation to a plurality of paths that issue from the first radio station or end at the first radio station, or can also be applied to other paths between radio stations of the radio communication system.

A subset of the subcarriers of the available frequency band is used for each of the at least two hops between the first and second radio stations. Allocation of the subcarriers to the various hops is not static however but changes over time. This means that in the case of a path that stays the same between the first and second radio stations, i.e. in the case of radio stations that are constant, which forward messages between the first and second radio stations, the subcarriers used change at least once for at least one of the hops. This can be achieved for example in that at the start the subcarriers 1 to 10 are used for a first hop and the subcarriers 11 to 20 for a second hop and at a later point in time the subcarriers 1 to 5 are used for the first hop and subcarriers 6 to 20 for the second hop.

In a development, the composition is varied as a function of a radio resource requirement of at least one radio station. In this connection the radio resource requirement of the first radio station and/or the second radio station and/or one or more radio station(s) of the hops between the first and second radio stations can in particular be taken into account. To take account of the radio resource requirement of a radio station this radio station can, for example, send a request message for radio resources which indicates the extent and/or type of radio resources required.

Additionally or alternatively the composition can be varied as a function of radio transmission conditions. In this connection radio transmission conditions which currently exist in relation to the at least two hops can in particular be included. If in a certain hop the radio transmission experiences for example great interference owing to poor radio transmission conditions, then it is advantageous to use other subcarriers or a larger number of subcarriers for this hop. The composition of the subset of subcarriers used for a hop can thus be adapted to the current radio transmission conditions which, for example, are determined by interference owing to other radio transmissions and shadowing effects.

Additionally or alternatively the composition of at least one of the subsets used can be varied as a function of the variation in the composition of at least one other of the subsets used. This proves to be advantageous for example if the subcarriers used for the individual hops are repeated at a specific reutilization interval, for example after three hops. A variation in the subcarriers at one hop can therefore lead to a variation in the subcarriers at a different hop if the same subcarriers are used for the two hops since the two hops have the specific reutilization interval.

It is advantageous if a subset of subcarriers that does not overlap the subsets of the other hops is used for each hop. This means that there is no subcarrier which is used by more than one of the hops between the first and second radio stations for radio transmission. Alternatively overlapping subsets of the subcarriers can be used for at least two hops that are not adjacent, i.e. for two hops that do not directly follow each other. Overlapping of subsets exists if the subsets completely or at least partially match. If for example there are three hops between the first and second radio stations it is possible for the first and third hops to at least partially use the same subcarriers, while subcarriers are used for the second hop which differ completely from the subcarriers of the first hop and from the subcarriers of the second hop.

It is particularly advantageous if the subsets are allocated by the first radio station. In this case the first radio station decides how the subsets used for the various hops are composed and communicates this either directly or via other radio stations to the radio stations involved in radio transmission in the hops. Centralized allocation of the subcarriers to the hops is involved in this connection; the first radio station is preferably a network-side radio station here.

According to one embodiment, before allocation of the subsets the first radio station receives information about radio transmission conditions relating to radio transmission in a least one of the hops, preferably in all hops between the first and second radio stations. The radio transmission conditions can be measured by the radio stations which transmit the messages in the hops. These radio stations can then transmit information about the radio transmission conditions to the first radio station in the hops. The first radio station can use the information about the radio transmission conditions to determine a suitable allocation of the subsets.

It is advantageous if messages are transmitted between the first radio station and the second radio station in a plurality of hops respectively between radio stations of adjacent hierarchical levels, the first radio station being associated with the highest hierarchical level and it being possible for the radio stations of each lower hierarchical level to in each case communicate directly with a radio station of the next higher hierarchical level but not with radio stations that are higher than the next higher hierarchical level. The first radio station allocates the radio stations of the second hierarchical level a subset of the subcarriers allocated to it for communication with radio stations of the third hierarchical level. Subcarriers are allocated to the first radio station, this allocation being accomplished for example by agreement between different radio stations or it being possible for it to be predetermined in the radio communication system. In addition to the first radio station there exist radio stations of a second hierarchical level which can communicate directly with the first radio station. The first radio station allocates some of the subcarriers allocated to it to these radio stations of the second hierarchical level. Allocation takes place for communication of the radio stations of the second hierarchical level with radio stations of the third hierarchical level.

It is also advantageous if at least one radio station of the second hierarchical level allocates a subset of the subcarriers allocated to it to radio stations of the third hierarchical level for communication with radio stations of the fourth hierarchical level. In general a radio station can allocate subcarriers allocated to it and/or subcarriers not allocated to it to radio stations of the next lower hierarchical level for communication with radio stations of the next lower hierarchical level than the next lower hierarchical level. This involves a hierarchical radio resource allocation, a radio station of a specific hierarchical level in each case being responsible for allocation of subcarriers to radio stations of the next lower hierarchical level. Allocation can relate to subcarriers which are allocated to the radio station of the specific hierarchical level or to their non-allocated subcarriers. This kind of hierarchical method for radio resource allocation is a decentralized method since it is not a single radio station that is responsible for allocation of subcarriers to the individual hops but instead a plurality of radio stations cooperates in the allocation of radio resources.

A first radio station communicates with a first, different radio station by using a first subset of subcarriers in order to communicate with a second, different radio station by using a second subset of subcarriers that is different from the first subset. The composition of at least one subset varies over time in this connection.

It is advantageous if the first radio station also receives and processes a message from the first, different radio station relating to an allocation to the first radio station of a third subset of subcarriers, and allocates a subset of the third subset of subcarriers to the second, different radio station, the third subset being a subset of the third subset and the second subset.

A second radio station sends and receives messages which are transmitted between a further radio station and the radio station in a plurality of hops between respectively adjacent radio stations, and allocates subsets of subcarriers to the hops, wherein in each case adjacent hops are not overlapping subsets.

The two radio stations are particularly suitable for carrying out the method, wherein this can also apply to the embodiment and development. They can include suitable means for this purpose. It is particularly advantageously if the radio stations are stationary network-side radio stations.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
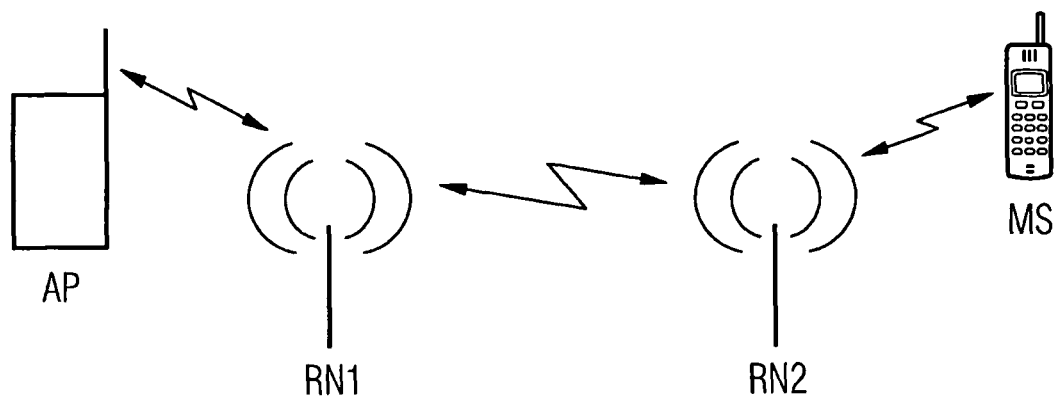
FIG. 1 shows a detail of a radio communication system.

Reference will now be made in detail to the preferred embodiments, examples of which are illustrated in the accompanying drawings, wherein like reference numerals refer to like elements throughout.

FIG. 1 illustrates a radio communication system with radio access point AP, two relays RN1 and RN2 and subscriber station MS. The relays RN1 and RN2 are network-side, stationary radio stations which are used to forward messages between subscriber stations and the radio access point AP. The radio access point AP can be a network-side radio station of a WLAN (AP: Access Point). The radio access point AP can be connected (not shown in FIG. 1) to a core network or to further communication systems, for example to the Internet. The radio communication system can include further radio access points, relays and subscriber stations which are not illustrated in FIG. 1 for the sake of clarity. In particular it is possible for the relays to not only be part of the path between the radio access point AP and the subscriber station MS but of a plurality of paths between the radio access point AP or another radio access point and various subscriber stations.

Direct communication is possible between the radio access point AP and the relay RN1 and between the relays RN1 and RN2 and between the relay RN and the subscriber station MS. A message is transmitted between the subscriber station MS and the radio access point AP in three hops since for direct communication the subscriber station MS resides too far away from the radio access point AP: with a message transmission in the downwards direction, i.e. from the radio access point AP to the subscriber station MS, the message is first of all transmitted from the radio access point AP to the relay RN1, then from the relay RN1 to relay RN2, and finally from the relay RN2 to the subscriber station MS. The reverse applies for message transmission in the upwards direction, i.e. from the subscriber station MS to the radio access point AP.

Figure 2:
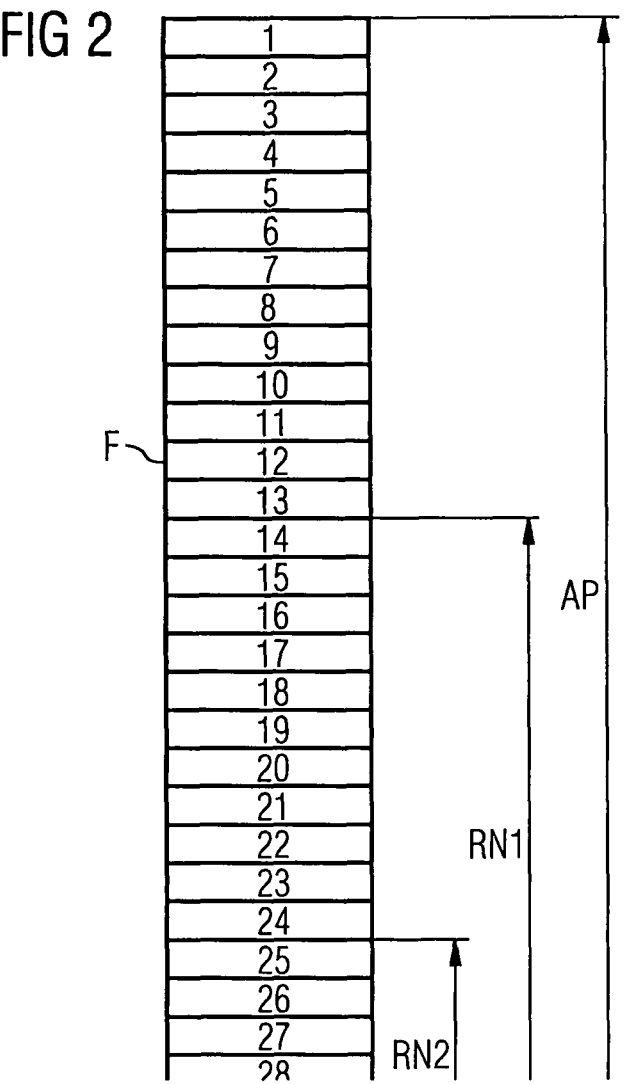
FIG. 2 shows a division of a frequency band.

The frequency band F shown in FIG. 2 is available in the radio communication system and is divided into 30 subcarriers, symbolized by horizontal bars with the numbering 1 to 30. An OFDMA separation method is used (OFDMA: Orthogonal Frequency Division Multiple Access), i.e. the signals are transmitted using the OFDM method, it being possible to distinguish messages from different senders by using different OFDM subcarriers. All 30 subcarriers are available for communication in the first hop, i.e. between the radio access point AP and the relay RN1 or between the radio access point AP and other radio stations, but only subcarriers 1 to 13 are used. The radio access point AP allocates the other subcarriers 14 to 30 to the relay RN1. Subcarriers 14 to 30 are therefore available for communication in the second hop, i.e. between the relay RN1 and the relay RN2 or between the relay RN1 and other radio stations, but only subcarriers 14 to 24 are used. The relay RN1 allocates the other subcarriers 25 to 30 to relay RN2 for communication of the relay RN2 with subscriber station MS or other radio stations. Subcarriers 1 to 13 are thus used for communication between radio access point AP and relay RN1, subcarriers 14 to 24 for communication between relay RN1 and RN2 and subcarriers 25 to 30 for communication between relay RN2 and subscriber station MS.

The subcarriers are allocated hierarchically in that each radio station, i.e. firstly the radio access point AP, then relay RN1, followed by relay RN2, allocates some of the subcarriers allocated to it to the following radio station. The radio stations form a hierarchy hereby, with the radio access point AP being part of the highest hierarchical level, relay RN1 part of the second hierarchical level and relay RN2 part of the third hierarchical level. The subcarriers allocated to a radio station of a hierarchical level include a subset of the subcarriers allocated to the radio station of the next higher hierarchical level. One radio station of hierarchical level n thus allocates n radio stations of hierarchical level n−1 subcarriers for communication with radio stations of hierarchical level n−2.

The described hierarchical allocation of radio resources can also be applied to the case of a plurality of radio stations per hierarchical level. All radio access points thus form the highest hierarchical level, all relays which can communicate directly with a radio access point the second hierarchical level, all relays which can communicate directly with a relay of the second hierarchical level but not with a radio access point the third hierarchical level, etc. The relays of the second hierarchical level are assigned to the radio access point with which they can communicate directly, the relays of the third hierarchical level to the same radio access point as the relay of the second hierarchical level with which they can communicate directly, etc. In relation to FIG. 2 this means that a specific radio access point uses subcarriers 1 to 13 for communication with all relays assigned to it of the second hierarchical level or with subscriber stations, and subcarriers 14 to 30 allocate all relays assigned to the specific radio access point to the second hierarchical level. Each of the relays of the second hierarchical level assigned to the specific radio access point can allocate a subset of the subcarriers 14 to 30 allocated to it to the relays of the third hierarchical level assigned to the specific radio access point which communicate with it directly, etc.

Hierarchical radio resource distribution ensures that a radio station of a specific hierarchical level cannot disrupt communication of a radio station of a higher hierarchical level since each radio station is only authorized, via the allocation of subcarriers allocated to it, to decide which radio stations of the higher hierarchical levels are not used.

As an alternative to the decentralized allocation of radio resources previously described, according to which each radio station further allocates some of the radio resources allocated to it, centralized allocation of radio resources is also possible. For this purpose the radio access point AP decides on distribution of the radio resources. The radio access point AP can thus communicate, for example according to FIG. 2 to the relay RN1, that the subcarriers 14 to 24 are available to it for communication with relay RN2 or radio stations of the same hierarchical stage as relay RN2, and subcarriers 25 to 30 are available to the relay RN2 for communication with radio stations of the next lower hierarchical level compared with relay RN2. The relay RN1 then informs relay RN2 about the radio resources allocated to relay RN2. Centralized distribution of the radio resources has the advantage that the intelligence to decide on allocation is concentrated in the centrally distributing device, according to the specific example in the radio access point AP. The relays RN1 and RN2 can be less complex in design as a result.

Rapid message transmission along the multi-hop path is possible as a result of the fact that different, non-overlapping groups of subcarriers are used for adjacent hops because by using different subcarriers for adjacent hops message transmission can simultaneously take place in the various hops. A message originating from the radio access point AP by way of example, which is received by the relay RN1 and is to be transmitted to the subscriber station MS, can thus be forwarded immediately from relay RN1 to relay RN2 since sending a message in the second hop does not disrupt communication on the first hop.

According to the previous descriptions a plurality of radio stations per hierarchical level, which are assigned to the same radio station of the next higher hierarchical level, are allocated the same subcarriers respectively. This configuration results with both centralized and decentralized allocation of radio resources. To avoid interference, produced as a result of joint use of subcarriers, the radio stations which divide the subcarriers execute suitable methods for accessing the radio resources, thus for example a CSMA/CA method (Carrier Sense Multiple Access/Collision Avoidance).

As an alternative to the previous description it is also possible for different radio stations per hierarchical level, which are assigned to the same radio station of the next higher hierarchical level, to be allocated different subcarriers. This can be achieved with decentralized allocation of radio resources in that a radio station of a specific hierarchical level allocates to a first radio station of the next lower hierarchical level, which communicates with it directly, a first subset of subcarriers, and to a second radio station of the same next lower hierarchical level, which communicates with it directly, a second subset of subcarriers. The radio access point in centralized radio resource allocation can analogously also allocate different subcarriers to radio stations of a hierarchical level which are assigned to the same radio station of the next higher hierarchical level.

If the radio access point AP decides centrally on the allocation of radio resources multiple use of subcarriers is also possible. The radio access point AP can for example thus allocate subcarriers 14 to 24 to the relay RN1 and subcarriers 35 to 30 to relay RN2 and furthermore subcarriers 10 to 13 which it also uses for communication. This takes account of the fact that adjacent hops do not use the same subcarriers in order to avoid interference.

Multiple allocation of subcarriers is also possible with decentralized allocation of subcarriers, wherein this constitutes a renunciation of the principle of hierarchical resource allocation. Thus for example the relay RN1 can decide to allocate subcarriers 25 to 30 and 10 to 13 to relay RN2. This counteracts the effect of the maximum number of available subcarriers decreasing from one hierarchical level to the next owing to hierarchical radio resource allocation. If multiple allocation of subcarriers is decided upon on a decentralized basis, before allocating subcarriers that have already been allocated the respective radio station should carry out measurements to assess the potential interference resulting from multiple allocation. The radio access point AP can intervene in the decentralized allocation of already allocated subcarriers by for example communicating above which hierarchical level subcarriers it is using are allowed to be allocated again.

Preferably, the division of the subcarriers among the various hops is not static but changes over time. This dynamic performance in allocating the subcarriers can be applied within the framework of decentralized as well as centralized resource allocation methods. It is thus possible for example with the decentralized allocation for a radio station of a specific hierarchical level to allocate a specific number of subcarriers to radio stations of the next lower hierarchical level. The bandwidth requirement of the radio station of the specific hierarchical level would increase thereafter since it has to send a large number of messages. On the basis of this there is a new allocation of subcarriers to the radio stations of the next lower hierarchical level with these being allocated a smaller number of subcarriers. Resource distribution in the radio communication system can thus be adapted to the current conditions, thus for example to the resource requirement on the basis of messages for transmission or to the radio propagation conditions.

Redistribution of the radio resources by the radio access point AP is particularly advantageous in combination with request messages for radio resources which the radio stations of lower hierarchical stages send. The relay RN1 can thus inform the radio access point AP directly about its radio resource requirement while the relay RN2 transmits a message to the radio access point AP via the relay RN1 to request a specific radio resource quantity. In addition to the radio resource requirement the current transmission conditions are a decisive factor in the decision on the distribution of the subcarriers by the frequency access point AP.

An advantage is that distribution of the radio resources in the form of available subcarriers to various hops of a multi-hop transmission is not fixed but can be dynamically adapted to the current conditions. The subcarriers can thus be distributed among the individual hops in the manner that is most advantageous at the respective instant. Fixed distribution on the other hand would lead to losses in message transmission efficiency.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for communication between radio stations in a radio communication system using a frequency band divided into subcarriers, comprising:

transmitting messages between a first radio station and a second radio station by radio in a plurality of hops respectively between adjacent radio stations of adjacent hierarchical levels using one of a plurality of subsets of the subcarriers for each hop and varying a composition of at least one of the subsets used over time, the first radio station being associated with a highest hierarchical level and the radio stations of each lower hierarchical level able to communicate directly with another radio station of a next higher hierarchical level but not with any of the radio stations in any hierarchical level higher than the next higher hierarchical level;

allocating by the first radio station to second radio stations of a second hierarchical level a first subset of the subcarriers allocated thereto for communication with third radio stations of a third hierarchical level;

allocating at least one of a second set of subcarriers allocated thereto and/or a third set of subcarriers not allocated thereto, to the lower radio stations of a next lower hierarchical level for communication with next lower radio stations of a still lower hierarchical level adjacent to the next lower hierarchical level.

2. The method as claimed in claim 1, wherein said transmitting includes varying the composition of the at least one of the subsets as a function of a radio resource requirement of at least one radio station.

3. The method as claimed in claim 2, wherein said transmitting includes varying the composition of the at least one of the subsets as a function of radio transmission conditions.

4. The method as claimed in claim 3, wherein said transmitting includes varying the composition of the at least one of the subsets as a function of variation in the composition of at least another of the subsets used.

5. The method as claimed in claim 4, wherein said transmitting uses for each hop a second subset of the subcarriers that does not overlap third subsets of other hops, or uses overlapping subsets of the subcarriers for at least two non-adjacent hops.

6. The method as claimed in claim 5, further comprising allocating the second and third subsets by the first radio station.

7. The method as claimed in claim 6, further comprising receiving, by the first radio station before said allocating of the first, second and third subsets, information about radio transmission conditions relating to radio transmission in at least one of the hops.

8. The method as claimed in claim 7, further comprising allocating, by at least one radio station of the second hierarchical level, a fourth subset of the subcarriers allocated thereto to at least some of the third radio stations of the third hierarchical level for communication with at least one fourth radio station of a fourth hierarchical level.

9. A radio station for communication in a radio communication system using a frequency band divided into subcarriers, comprising means for communicating with a first radio station of a higher adjacent hierarchical level by using a first subset of the subcarriers and for communicating with a second radio station of a lower adjacent hierarchical level by using a second subset of the subcarriers, different from the first subset, while varying a composition of at least one subset over time;

means for receiving and processing a message from the first radio station relating to an allocation to said radio station of a third subset of the subcarriers;

means for allocating a fourth subset of the third subset of the subcarriers to the second radio station, the third subset including the second subset and the fourth subset; and means for allocating at least one of a second set of subcarriers allocated thereto and/or a third set of subcarriers not allocated thereto, to the lower radio stations of a next lower hierarchical level for communication with next lower radio stations of a still lower hierarchical level adjacent to the next lower hierarchical level.

10. A radio communication system, comprising:
a radio station as claimed in claim 9.

\* \* \* \* \*